US005832274A

United States Patent [19]

Cutler et al.

[11] Patent Number: 5,832,274
[45] Date of Patent: Nov. 3, 1998

[54] METHOD AND SYSTEM FOR MIGRATING FILES FROM A FIRST ENVIRONMENT TO A SECOND ENVIRONMENT

[75] Inventors: Bruce R. Cutler, Murray; Reid W. Poole; Renea B. Campbell, both of Orem, all of Utah

[73] Assignee: Novell, Inc., Provo, Utah

[21] Appl. No.: 728,308

[22] Filed: Oct. 9, 1996

[51] Int. Cl.$^6$ ................................................. G06F 17/60
[52] U.S. Cl. ............................................................ 395/712
[58] Field of Search .................................. 395/712, 653, 395/200.51; 707/203

[56] References Cited

U.S. PATENT DOCUMENTS

| | | | |
|---|---|---|---|
| 5,367,698 | 11/1994 | Webber et al. | 395/800 |
| 5,410,703 | 4/1995 | Nilsson et al. | 395/700 |
| 5,586,304 | 12/1996 | Stupek, Jr. et al. | 395/712 |
| 5,608,874 | 3/1997 | Ogawa et al. | 395/200.15 |
| 5,708,812 | 1/1998 | Van Dyke et al. | 395/712 |

OTHER PUBLICATIONS

*Installing and Using NetSync*, Undated, Novell, Inc.
Migrating to NetWare 4.11 Using the Across–the–Wire Method, Bruce Cutler and Lee Lowry, Novell Application Notes, Sep. 1996, pp. 5–20.
Novell's Guide to NetWare 4.1 Networks, 1996, pp. 733–794.
Novell Consulting Migration Tools, 1995, pp. 1–36.
Novell Consulting, Banyan VINES to NetWare 4 Migration Overview, Jan. 1996, pp. 1–14.

*Primary Examiner*—Lance Leonard Barry, Esq.
*Attorney, Agent, or Firm*—Dinsmore & Shohl LLP

[57] ABSTRACT

A method for migrating a file system and access rights associated with the file system from a first network operating system to a second network operating system. The method according to this invention achieves a highly reliable and relatively quick process for migrating from one network environment to another network environment. Mapping information associating objects in the first network environment with objects in the second network environment is maintained in the object database of the first network environment. A process is initiated in the first environment to read and communicate the file system and file access rights from the first environment to the second environment. A process is initiated in the second environment to accept the file system and file access rights from the first environment. The second process recognizes object identifiers associated with the first environment and accesses the mapping information to determine which object in the second environment is associated with the object from the first environment. The second process then obtains an object identifier of the object in the second environment and stores the object identifier in the file object list of the file so that the object in the second environment has identical access rights to the file as did the corresponding object in the first environment.

17 Claims, 2 Drawing Sheets

METHOD AND SYSTEM FOR MIGRATING FILES FROM A FIRST ENVIRONMENT TO A SECOND ENVIRONMENT

FIELD OF THE INVENTION

This invention relates generally to file systems and file access rights in a network operating system, and more particularly to migrating a file in a first network operating system to a second network operating system while maintaining the file access rights across the two environments.

BACKGROUND OF THE INVENTION

Networks which include a file server and one or more client computers coupled to the file server over a communications path are widely used today. Full featured file servers usually execute a network operating system which implements and manages the services available from the file server. A network operating system typically includes at least two subsystems, a file subsystem and a management services subsystem. The file subsystem includes the files maintained on the file server, and file access information used to determine which users and what access such users have to each file. Among other information, the management services subsystem includes a list of user objects identifying users permitted to log into the file server, group objects which group user objects into related groups, and various other objects, such as those identifying printers and print queues. Objects include several attributes, including an object identifier, which is usually a numeric value, and an object name, which is usually an alphanumeric value.

When a program running on a client computer coupled to the network initially attempts to access a file on the file server, the computer communicates to the file server the access request and an object name of the object identifying the user of the program. To determine whether the user of the program has access rights to the file, the network operating system accesses a file object list associated with the file which contains one or more object identifiers of objects maintained in the management services subsystem. The network operating system then determines if any object in the file object list matches the object passed along with the file access request. If not, the network operating system refuses access to the file. If one of the objects contained in the file object list of the file matches the object accompanying the file access request, the network operating system ensures that the object has the appropriate access rights for the particular type of access requested. For example, if the program is attempting to write to the file, the user of the program must have write access rather than read-only access to the file. Although the foregoing description is a simplified version of the actual process, it generally describes the process for granting file access rights in certain network operating systems, such as the Novell® NetWare® network operating system.

The vendors of network operating systems from time to time make available new and enhanced versions, or releases, of their network operating system. Vendors desire to provide a migration process by which users of one release of the network operating system can migrate to a newer release of the network operating system in a simple, reliable, and problem-free manner while successfully migrating all of the information maintained by the network operating system. Moreover, vendors desire to provide such migration processes to encourage users of competitive network operating systems to migrate to the vendor's network operating system. A reliable, simple and problem-free migration tool which successfully migrates all the data on the server is critical because if migrating from one network operating system to another network operating system, whether a new version or a completely different network operating system, is perceived to be troublesome, users frequently choose not to migrate. If users choose not to migrate, substantial future sales can be lost. Thus, providing such a reliable, simple to use and problem-free migration process for migrating from one network operating system to another is quite important.

One conventional migration process used to migrate users from one version of a network operating system, for example a 1.0 release, to a newer version of the network operating system such as a 2.0 release, is to initially configure a second file server on a network to which an existing 1.0 server is coupled. The second file server is loaded with the newer 2.0 network operating system and the file subsystem and management services subsystem on the 1.0 server is migrated to the 2.0 server. This is achieved by first creating on the 2.0 server a new management services subsystem, which contains objects to which the objects in the management services subsystem on the 1.0 server can be mapped. The process that creates the new management services subsystem usually creates an independent structure of mapping information. This structure contains records which map an object on the 1.0 server to an object on the 2.0 server. The mapping is merely the association between an object on the 1.0 server and an object on the 2.0server. For example, the object having the object name 'JONES' on the 1.0server may be mapped to the object having the object name 'TOM JONES' on the 2.0server, which means that the file access rights associated with object 'JONES' on the 1.0 server should be given to object 'TOM JONES' on the 2.0 server during the migration process. The actual migration process is driven by a program running on a client computer coupled to the network.

The migration process reads each file from the 1.0 server and writes each file to the 2.0 server. For each file object identifier in the file object list associated with each file, including owner information, trustee information, and archive owner information, the program utilizes the mapping information to determine which object on the 2.0 server should be given identical access rights to each particular file.

There are several problems associated with this approach to migration of a network operating system. First, this approach can be relatively time-consuming because each file is transmitted over the network twice, once when the process reads the information from the 1.0 server to the client computer, and once when the process writes the information from the client computer to the 2.0 server. Another problem is that due to the large number of attributes and information associated with each file on a full featured network operating system, such as creation date, creation time, modification date, modification time, type of file, length of file, last archive date, last access date, and many more attributes of information, the migration program either must be relatively complex and correspondingly difficult to develop and debug, or must intentionally choose to migrate only certain information from the 1.0 server to the 2.0 server. Neither of these options is desirable.

Another unfortunate aspect of such a conventional migration process is that the mapping information which identifies which object in the 2.0 environment corresponds to which object in the 1.0 environment exists in an independent mapping structure, separate from the management services subsystem, and, thus, is not accessible to other programs which run on the file servers which may need to utilize this mapping information.

Thus, it is apparent that a different methodology, or framework, for migrating from one network operating system to another network operating system which improves reliability, decreases development time, decreases migration time, migrates all or most of the abundance of information maintained on a file server, and which maintains the mapping information in a global location for use by other programs would be highly desirable.

SUMMARY OF THE INVENTION

It is one object of this invention to provide a method for migrating a file system and access rights associated with the file system from a network operating system in a first environment to a network operating system in a second environment and reliably migrate all or a substantial amount of the information.

It is another object of this invention to provide a method for migrating from one network operating system to another network operating system which achieves the migration in a relatively short time frame.

It is still another object of this invention to provide a method for transferring a file system and access rights associated with the file system from a first environment to a second environment which stores mapping information, including which objects in the second environment are associated with which objects in the first environment in a location accessible to other processes.

It is still another object of this invention to provide a novel migration framework which achieves the above objects, and which allows the use of existing tools to improve reliability and decrease migration tool development time.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a method is provided for transferring a file and access rights associated with the file from a first environment to a second environment. The first environment has a first object reference list, which includes a list of objects in the first environment, each object having an object name and an object identifier. The file access rights are in part preferably implemented through a file object list associated with each file which contains an object identifier of an object in the first object reference list. The second environment has a second object reference list containing a list of objects in the second environment. A first mapping structure exists which includes an association between a first environment object and a second environment object.

For each association in the first mapping structure, a second mapping structure is loaded in either the first environment or the second environment with mapping information which is operative to establish which second environment object is associated with which first environment object. Each association in the second mapping structure is retrievable as a function of an attribute of the object of the first environment object.

A first process is initiated in the first environment which reads and transmits a stream of data which includes the file and the file object list associated with the file. A second process is initiated in the second environment which receives the stream of data. The second process recognizes in the stream of data the file object list associated with the file and retrieves from the second mapping structure as a function of the object identifier in the file object list mapping information operative to associate a second environment object with the first environment object. The second process stores in the second environment the file along with a new file object list associated with the file, the new file object list containing an object identifier referencing the second environment object associated with the first environment object.

According to one embodiment of this invention, the first object reference list in the first environment is used as the second mapping structure in which mapping information operative to establish which second environment object is associated with which first environment object is stored. Utilizing the first environment object reference list simplifies the formation of the second mapping structure because the first environment object reference list already includes first environment objects accessible via a reference such as an object identifier. A property can be added to each object in the first environment object reference list, the property being utilized to store a reference such as an object name or object identifier of the second environment object associated with the first environment object. Thus, the second process need only extract the object identifier from the stream of data and access the first environment object reference list as a function of the object identifier and extract the previously loaded second environment object identifier or name of the second environment object which is associated with the first environment object. The second process can then store the second environment object identifier with the file thereby migrating the file and the access rights associated with the file from the first environment to the second environment. According to one preferred embodiment, the first object reference list is a NetWare bindery database.

The migration framework provided by the method according to this invention improves over conventional migration processes in several important ways. The time to perform the migration process is decreased by preferably transmitting the information over the network only once. Further, the mapping information which indicates which second environment objects are associated with which first environment objects is preferably loaded into a global and already existing object reference list, which eliminates the need to create a new mapping structure indexed by the first object identifier, and also makes the mapping information available for use by subsequent processes executing in the first and/or second environments. Another advantage achieved by the framework according to this invention is that by using processes which execute in the first environment and the second environment rather than on a client computer, software which may already exist to read and write file server information may be utilized to carry out the method of this invention with only modest modification. For example, most network operating systems include software for backing up a file server to a secondary storage medium, such as a tape drive, as well as restoring the file server from the secondary storage medium in the event of data corruption, or complete loss of the file server. The framework provided by the method according to this invention enables the use of such backup and restore programs, or other available software which reads and writes file, file attribute information and file access information.

For example, the method according to this invention can be implemented by modifying an existing network operating system backup utility capable of backing up the information in the first environment to send the backup information to the second environment rather than a secondary storage medium. An existing network operating system restore process capable of restoring the second environment from a backup existing on a secondary storage medium can be modified to recognize the backup stream of data from the backup process in the first environment, to extract file object lists containing object identifiers of objects in the first environment, to access the mapping information in the second mapping structure as a function of the object identifier to derive a second environment object, and to store a new file object list containing the object identifier of the second environment object rather than the original file object list. The ability to use such existing software greatly reduces the development time needed to create a migration tool, and also greatly increases the reliability and thoroughness of the data migrated. This is so because such backup and restore software was developed to provide the critical function of backing up and restoring information on a file server, and thus such software can provide reliability and thoroughness not easily duplicated.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serves to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF PREFERRED EMBODIMENTS

Figure 1:
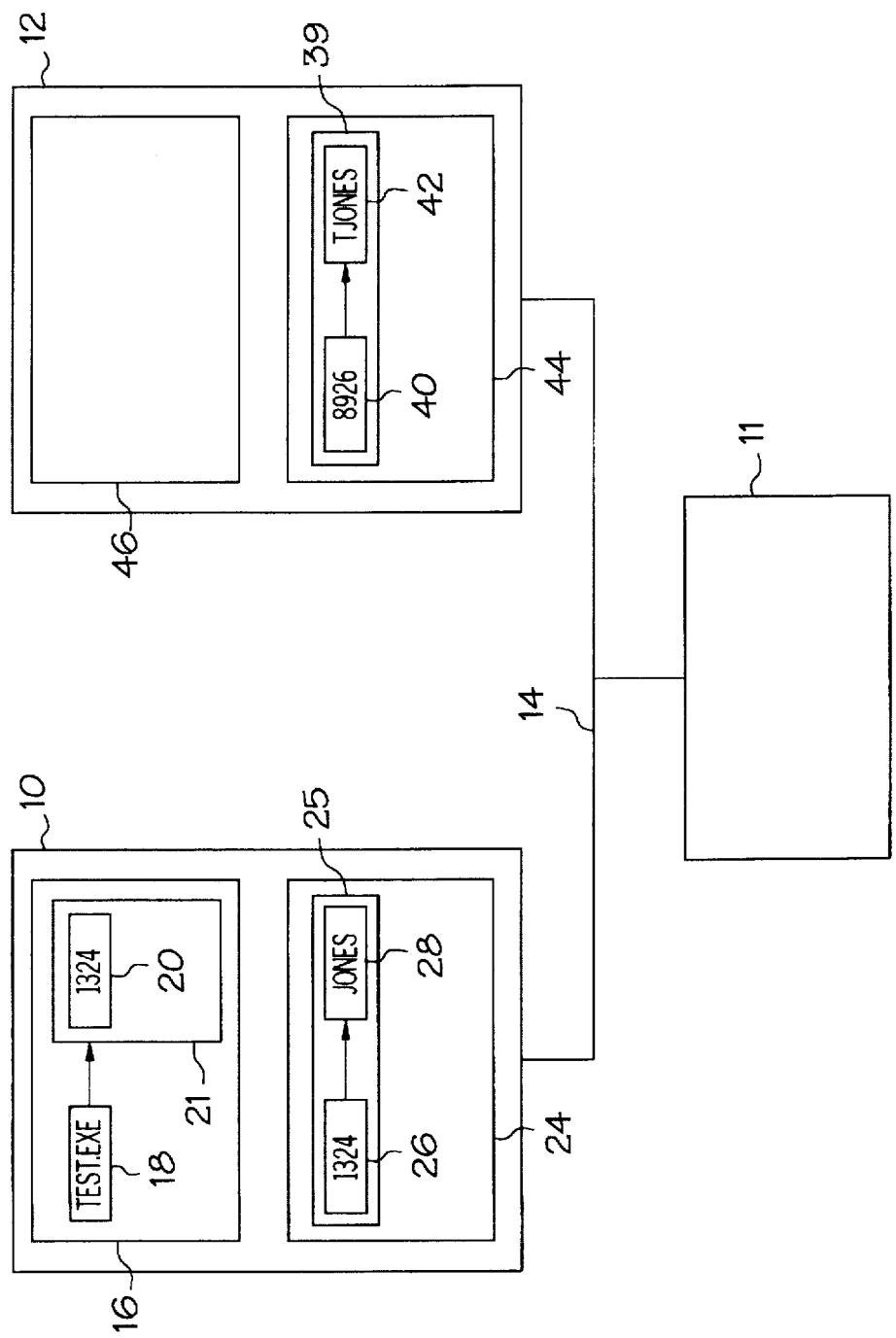
FIG. 1 is a block diagram illustrating a simplified first and second environment as they may exist prior to carrying out the method according to one embodiment of this invention.

Referring now to the drawings, FIG. 1 shows a simplified block diagram of first and second environments as they might appear prior to carrying out the method according to one embodiment of this invention. First environment 10 includes file system 16 and object reference list 24. File system 16 comprises file 18 and file object list 21, which includes one or more object identifiers, such as object identifier 20, each of which refers to an object in object reference list 24. Object reference list 24 comprises object identifier 26 and object name 28. Reference to an object refers generally to any type of object contained in object reference list 24 which can be referred to via file object list 21. For example only, an object can comprise a user object which identifies a particular user of the network, or a group object which refers to a plurality of user objects. In some network operating systems such objects may be referred to as identifiers. Access rights can be given to either or both a user object and a group object, and the method according to this invention is not limited to one or the other. Access rights can include ownership of the file, the capability to read and/or write the file, the capability to archive the file, and other forms of access to the file.

Object reference list 24 may include information other than object identifier 26 and object name 28, and in a preferred embodiment comprises a NetWare bindery database. The example provided in this specification is generally described with reference to first environment 10 comprising a 3.x NetWare network operating system and second environment 12 comprising a 4.x NetWare network operating system. However, such reference is made only for reasons of illustrating one embodiment of the invention, and it is apparent that the invention disclosed herein is applicable to a variety of network operating systems.

First environment 10 maintains a link from file 18 to object 25 via a reference such as object identifier 20. Object identifier 20 can be used to retrieve object 25, and object name 28. Object identifier 20 is preferably a numeric, or binary value and is preferably used rather than the actual alphanumeric value contained in object name 28 for space considerations, since a relatively long alphanumeric value can be more efficiently represented by a binary value. Thus, typically file 18 will contain a reference such as object identifier 20 which can then be utilized to obtain object 25 and object name 28, although if space considerations are not important, object name 28 could be used rather than object identifier 20.

When a program executing on computer 11 initially attempts to access file 18 in first environment 10, a file access request which includes the object name of the object associated with the user logged on to computer 11 is communicated to first environment 10. The network operating system obtains file object list 21 associated with file 18, and uses object identifier 20 to obtain object name 28. Although only a single object identifier 20 and object 25 are shown for purposes of illustration, there are typically a plurality of object identifiers in file object list 21, and a plurality of objects listed in object reference list 24. Mechanisms for translating object identifier 20 to object name 28, or translating object name 28 to object identifier 20 are known to those skilled in the art, and with respect to the NetWare network operating system are documented in the 'NetWare SDK NLM ™Library Reference', available from the Novell Corporation, Orem, Utah. The network operating system determines if object name 28 is the same as the object name accompanying the file access request. If object name 28 is not the same as the object name accompanying the file access request, file access request is denied. If, however, object name 28 does have the same value as the object name accompanying the file access request, then the network operating system ensures that the type of file access requested, such as a read or write access, is permitted. If it is, file access is granted, if not, file access is denied. This is a simplified description of how a file access request is handled by a conventional network operating system, such as the NetWare network operating system, and the interrelation between file system 16 and object reference list 24 during such a file access request. Additional details describing the process by which the NetWare network operating system allows access to a file is described in 'NetWare SDK, NetWare 4.0 Architecture', available from the Novell Corporation.

Also shown in FIG. 1 is second environment 12. Second environment comprises file system 46 and object reference list 44. In a preferred embodiment, second environment 12 comprises a 4.x NetWare network operating system and object reference list 44 comprises a NetWare Directory Services (NDS) directory. Object reference list 44 contains object 39, which includes object name 42 and object identifier 40. File system 46 does not include a file corresponding to file 18 in first environment 10 because the file migration process according to this invention has not yet been initiated.

Figure 2:
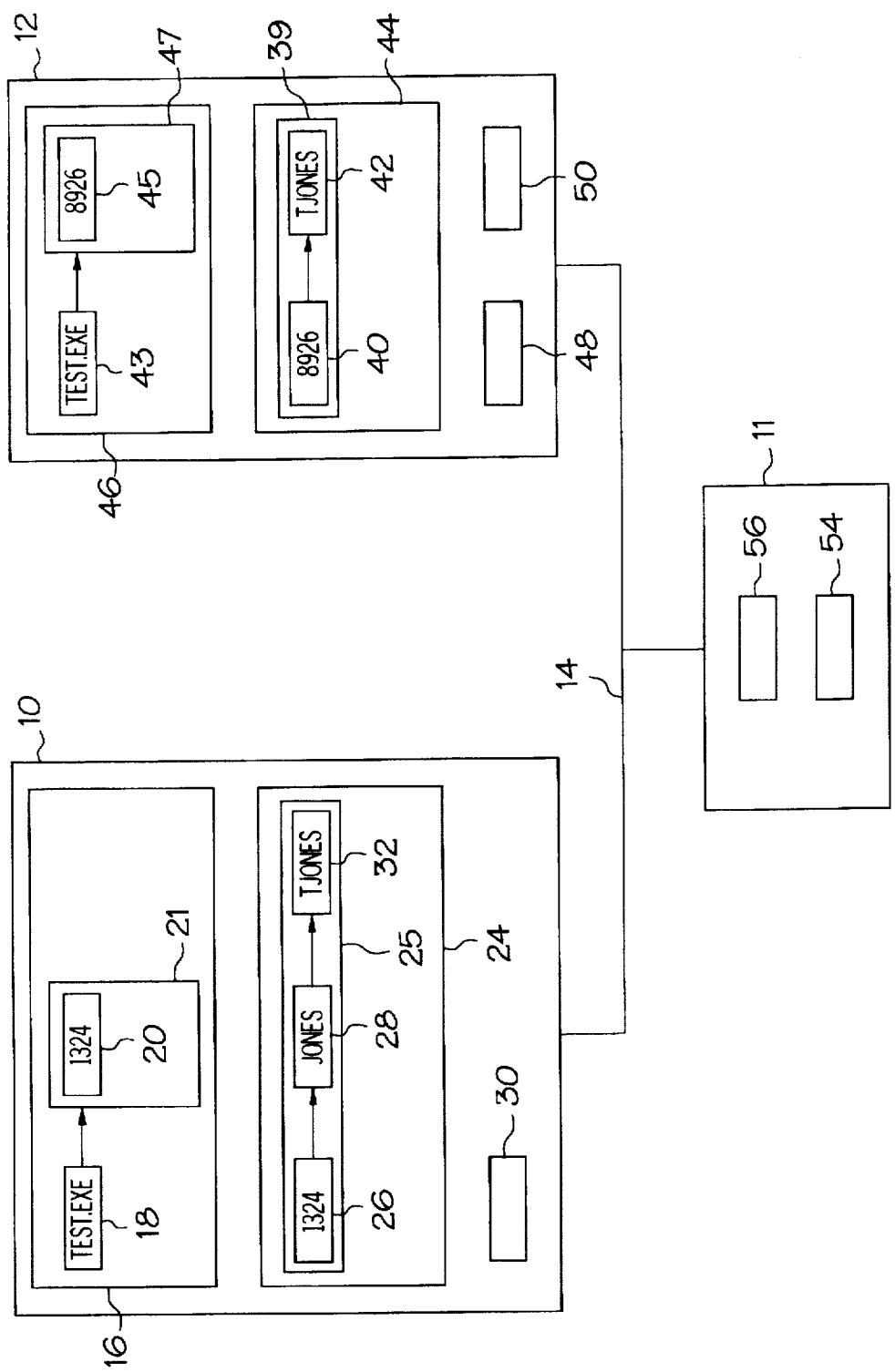
FIG. 2 is a block diagram illustrating a simplified first and second environment as they may exist during the carrying out of the method according to one embodiment of this invention.

FIG. 2 shows a simplified block diagram illustrating a simplified first and second environment as they may exist during the carrying out of the method according to one embodiment of this invention. FIG. 2 assumes that a process was earlier executed, for example on computer 11, in which a user indicated that the files owned or accessible by object 25 in first environment 10 should be equally owned or accessible by object 39 in second environment 12, after the files have been migrated from first environment 10 to second environment 12. This user-supplied information is used to create mapping structure 56, which indicates that object 25 in first environment 10 maps to object 39 in second environment 12. It is apparent that such information could also be obtained in other ways, such as via a user-supplied file.

Manager process 54 is preferably initiated on computer 11 and reads the mapping information from mapping structure 56 and loads such mapping information on either first environment 10 or second environment 12. According to a preferred embodiment of this invention, manager process 54 updates object reference list 24 with the mapping information by creating a new attribute in object reference list 24 which can be used to store a reference to the second environment object which is associated with a particular first environment object. The reference can include any information which identifies the appropriate second environment object, such as the object identifier or object name. As shown in FIG. 2, object name 32 has been added to object reference list 24 to indicate that object 25 in first environment 10 will map to object 39 in second environment 12. Although object name 32 has been used to establish the mapping between object 25 and object 39, it is apparent that any other information which refers to object 39 in second environment 12 would be appropriate. For example, object identifier 40 could be stored with object 25 to establish the mapping between object 25 and object 39, rather than object name 32.

Manager process 54 provides one way of generally managing the process of migrating file 18 and file object list 21 from first environment 10 to second environment 12. An overview of the action taken by manager process 54 while migrating file 18 and file object list 21 from first environment 10 to second environment 12, according to one embodiment of this invention, is provided in the following steps:

1. Before executing manager process 54, migrate object reference list 24 to object reference list 44, indicating mapping of objects, and create mapping structure. This can be accomplished by tools available and known to those skilled in the art, such as the DSMigrate tool available from the Novell Corporation.

2. Manually load the TSAXXX.NLM (read process 30) in first environment 10, via a Load command at the server console. The XXX is replaced with 311 for a 3.11 server or 312 for a 3.12 server.

3. Initiate manager process 54.

a. Verify that the user is connected to first environment 10 and to an NDS tree (object reference list 44 in second environment 12), or other appropriate object reference list in second environment 12.

b. Request following information from user: (source server, source volume, source password, destination server, destination volume, destination directory, destination password).

c. Load the TSA410.NLM (load process 48) in second environment 12.

d. Load the MAP3XIDS.NLM in second environment 12.

e. Connect to read process 30 via a call to NWSMTSConnectToTSA. If read process 30 was not loaded, this call will fail and manager process 54 will not proceed. Connect to read process 30 via a call to NWSMTSConnectToTargetService.

f. Connect to load process 48 via a call to NWSMTSConnectToTSA and NWSMTSConnectToTargetService.

g. Read the mapping structure created in step 1, and write out the NDS_NAME property into the appropriate bindery object (particular object in object reference list 24), by:

i. Reading the first mapping structure using conventional 'C' API's (application programming interfaces). (See The 11 C Programming Language by Brian W. Kernighan and Dennis M. Ritchie).

(1) Reading each first environment object name and obtaining the corresponding object identifier from object reference list 24 by calling NWGetObjectID.

ii. Calling the NWCreateProperty function to create a new property called NDS_NAME.

iii. Calling the NWWritePropertyValue function to add the object name of the object in the second environment associated with the first environment object.

h. Copy the directories and/or files and file access information (file 18 and file object list 21) by the following steps:

i. Call:

(1) NWSMPutOneName to fill a buffer with the beginning path to copy from (2) NWSMTSScanDataSetBegin to begin the scan for files and directories in first environment 10 ii. For each file or directory found in first environment 10, call:

(1) NWSMTSOpenDataSetForRestore to open the file or directory in second environment 12 to receive the data (2) NWSMTSOpenDataSetForBackup to open the file or directory on first environment 10 to get the data (3) NWSMTSReadDataSet to read the file or directory information from first environment 10

(4) NWSMTSWriteDataSet to write the file or directory information to second environment 12

(5) NWSMTSCloseDataSet to close the source file or directory on first environment 10

(6) NWSMTSCloseDataSet to close the destination file or directory on second environment 12

(7) NWSMTSScanNextDataSet to get the next file or directory from first environment 10. While there are more files or directories to be copied, these steps are repeated.

iii. When finished migrating file or directories from first environment 10 to second environment 12, call:

(1) NWSMTSScanDataSetEnd to finalize the scan routines i. Call NWSMTSReleaseTargetService and NWSMReleaseTSA to disconnect from the source target service (read process 30)

j. Call NWSMTSReleaseTargetService and NWSMReleaseTSA to disconnect from the destination target service (load process 48)

k. Unload the MAP3XIDS.NLM (map process 50) and TSA410.NLM (load process 48) from second environment 12.

Although the foregoing illustrates manager process 50 forwarding file 18 from first environment 10 to second environment 12, it is apparent that the appropriate calls made by manager process 50 could be made by a process in first environments 10 and 12, such as by read process 30 and load process 48, to eliminate having to send the data over network 14 twice.

The foregoing was a concise overview of steps carried out by manager process 54 according to one embodiment of this invention, with reference made to Novell NetWare environments. It is apparent that the method according to this invention could be carried out in a similar way with respect to other network environments. Certain of the steps described above will be described in more detail below, and additional embodiments will be discussed. Read process 30 is initiated to read file system 16 and communicate file 18 and object identifier 20 over network 14. According to one embodiment of this invention, manager process 54 initiates read process 30. In a full featured network operating system, file 18 will contain many attributes which are not illustrated in FIG. 2. For example, file 18 will have a creation date attribute, a creation time attribute, a modification date attribute, a modification time attribute, a length attribute, and many other file attributes. It is apparent that migration of all or at least a substantial number of these attributes from first environment 10 to second environment 12 would be highly desirable. Thus, read process 30 is preferably capable of communicating all or at least a substantial number of the file attributes associated with file 18 over network 14. One problem with generating such a program is that it must be relatively complex in order to migrate all information associated with each file. An unfortunate reality in software development is that unreliability increases as a function of complexity.

One of the advantages achieved by the migration framework according to this invention is that a process which already exists that is capable of reading the information in first environment 10 can be utilized with certain modifications to carry out the steps of read process 30. One such process which most network operating systems include is a backup task for downloading all the information on a file server to a secondary storage medium such as a tape backup device. Such a process is usually well tested and painstakingly developed because of the critical nature of the function it provides. With certain modifications, such a process can be modified to communicate the information over network 14 to second environment 12 rather than a tape backup device. This ensures that all the attributes associated with each file are successfully migrated from first environment 10 to second environment 12. According to one embodiment of this invention, read process 30 comprises the backup process available for NetWare 3.x network operating systems. Use of such backup software achieves a very reliable and well-tested process for comprehensively downloading file 18, file object list 21 and all attributes associated with file 18. The interface into the NetWare network operating system for obtaining file object list 21, object identifier 20 and file attributes associated with file 18 is documented in 'NetWare SDK: NetWare 4.0 Architecture', available from the Novell Corporation.

Read process 30 can be initiated in first environment 10 by entering a command at a console attached to first environment 10, or from first computer 11, according to the appropriate and documented procedures known to those skilled in the art for achieving such process initiation. After initiation, connection to read process 30 may be necessary, depending on the network operating system being used. For example, in the NetWare network operating system environment, one could connect to read process 30 in first environment 10 through the NWSMConnectToTSA(source server) function, and by communicating the appropriate password through the NWSMConnectToTargetService (sourceServer, sourceUserName, password) function. Both of these functions are known to those skilled in the art and are documented in 'SMS SDK - Storage Management Services: Target Service API Reference', available from the Novell Corporation.

Manager process 54 also initiates load process 48 for ultimately receiving the stream of data communicated over network 14 by read process 30. Process 48 can be loaded via documented procedures for initiating a process in a remote environment. The data stream communicated over network 14 by read process 30 can be first received by manager process 54 and then communicated to load process 48, or read process 30 can communicate the data stream over network 14 directly to load process 48, which greatly reduces the migration time because the data stream is only communicated over network 14 once.

Load process 48 receives the data stream and recognizes that object identifier 20 is a reference associated with first environment 10. Such recognition can occur, for example, by utilizing a data stream protocol in which each data object is preceded by type and size information, such as the ECMA-208 standard. It is apparent that other methods could be utilized to determine that the reference in the data stream is associated with first environment 10 rather than second environment 12. Load process 48 passes the reference to map process 50 to determine if object identifier 20 has been associated with a particular object in second environment 12. Map process 50 can be initiated by manager process 54. One mechanism for initiating map process 50 from computer 11 is to invoke the NWSMLoadNLM (connectionHandle, buffer) function. This function is documented in 'NetWare SDK: NLM Specific Function Reference', available from the Novell Corporation. Map process 50 accesses object reference list 24 in first environment 10 and extracts the information in object reference list 24 relating to object 25, and determines that object name 32 is a second environment identifier which is associated with object 25. Although the precise mechanism for accessing object reference list 24 can vary, according to one embodiment of this invention object reference list 24 is a NetWare bindery. Adding a property to store object name 32, and retrieving a structure from a NetWare bindery is documented in 'NetWare SDK NLM™ Library Reference', available from the Novell Corporation. According to one embodiment of this invention, map process 50 exports the following function for invocation by load process 48.

| NWCCODE MapBinderyIDToDSName ( | |
|---|---|
| unsigned long | objectID, |
| unsigned int | objectType, |
| char | *objectName, |
| char | *dsName) |

Thus, map process 50 accepts from load process 48 object identifier 20, the object type, and object name 28, and returns to load process 48 object name 32. This assumes that object identifier 20, object name 28 and the object type were present in the data stream communicated to second environment 12, although it is apparent that the additional information such as object type and object name are implementation dependent, as such variables are not necessary to properly convert object identifier 20 in first environment 10 to a reference such as object name 32 in second environment 12. The dsname corresponds to object name 32, although as discussed above, rather than storing object name 32 in object 25, another reference such as object identifier 40 could have been used, since either can be obtained via the other. Using this information, map process 50 invokes the following function:

| | |
|---|---|
| NWCCODE | MGReadBindery(NWCONN_HANDLE connection, FileInfo *pFInfo). |

This function accepts a pointer to a structure containing an object id, an object type and an object name, and returns the pointer to the corresponding object in object reference list 24 if such object exists. Map process 50 utilizes the return pointer to extract object name 32 from the structure and then verifies that object name 32 is a valid object name in second environment 12. If it is, map process 50 obtains object identifier 40 associated with object name 42.

Map process 50 returns object identifier 40 to load process 48. Load process 48 stores object identifier 40 in file object list 47 associated with file 43. As illustrated in FIG. 2, object 39 now has identical access rights to file 43 in second environment 12 as object 25 had to file 18 in first environment 10. Thus, file 18 and its file access rights were properly migrated from first environment 10 to second environment 12.

Although the embodiment shown illustrates load process 48 and map process 50 as two separate processes, it is apparent that the functionality of map process 50 could be incorporated entirely into load process 48, if the modularity provided by two separate processes is not desired.

As mentioned above, one advantage of the frame work provided by the method according to this invention is that most conventional network operating systems include a process which is capable of restoring the operating system environment, including file systems, file attributes and object reference lists from a backup storage device. Such a process can be modified to achieve the load portion carried out by load process 48. An advantage of modifying such an existing process is that such restore processes are typically stable and extraordinarily well tested processes since without a reliable restore process one could not trust their data in such a network operating system. According to one embodiment of this invention, load process 48 comprises a modified version of the restore process available for 4.x NetWare network operating systems. The restore process is modified to recognize a reference such as object identifier 20 from a different environment such as first environment 10. The restore process is also modified to either retrieve from first environment 10 the object name of the object in second environment 12 which is associated with the reference from first environment 10 or to call a function such as map process 50 with the appropriate reference from first environment 10 to retrieve the object name of the object from second environment 12, as described above. The restore process is also modified to accept the new object identifier from second environment 12 and store the new object identifier in the file object list rather than the original object identifier received in the stream of data.

A relatively important advantage achieved by the method according to this invention is that the mapping information which maps objects from first environment 10 to objects in second environment 12 is retained globally, that is on a file server rather than a client computer, where it can be accessed by any other process which would find such mapping information useful. The majority of network operating systems in use today have an object reference list containing objects which can be accessed by an object identifier and/or an object name. Preferably, the mapping information is stored in the object reference list in the first environment. This greatly reduces the effort necessary to create a relationship between a first environment object and a second environment object since the object reference list already exists, and is already capable of returning an object and its attributes via an object identifier and/or object name. Thus, according to the method of this invention, one need only create a new attribute for each object and store the second environment object identifier in the attribute.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method for migrating at least one file and access rights associated with the at least one file from a first server to a second server, the first server having a first object reference list including a list of first server objects, the access rights including one or more references associated with the at least one file, each reference referencing a first server object in the first object reference list, the second server having a second object reference list containing a list of second server objects, a first mapping structure including an association between a first server object and a second server object, the method comprising:

a) for each association in the first mapping structure, loading a second mapping structure in one of the first server and the second server with mapping information operative to establish which second server object is associated with which first server object, each association being retrievable as a function of the reference referencing the first server object;

b) initiating a first process which reads and transmits a stream of data comprising the at least one file and the reference associated with at least one file;

c) initiating a second process which receives the stream of data;

d) recognizing in the stream of data the reference associated with at least one file;

e) retrieving from the second mapping structure via the reference the mapping information operative to associate a second server object with the first server object associated with the reference; and f) storing in the second server the at least one file and a new reference associated with the at least one file which references the second server object associated with the first server object.

2. A method according to claim 1, wherein the second mapping structure comprises the first object reference list.

3. A method according to claim 2, wherein the first object reference list comprises a bindery.

4. A method according to claim 2, further comprising creating a new object property in the first object reference list, the new object property being operative for storing the reference to the second server object associated with the particular first server object.

5. A method according to claim 1, wherein the fist process executes in the first server.

6. A method according to claim 5, wherein the first server executes a first network operating system.

7. A method according to claim 6, wherein the first process is a backup process operative to generate a backup of the first server, the backup including the at least one file and access rights associated with the at least one file.

8. A method according to claim 1, wherein the second process executes in the second server.

9. A method according to claim 7, wherein the second server executes a second network operating system.

10. A method according to claim 9, wherein the second process comprises a restore process operative to restore the second server from a backup medium.

11. A method according to claim 1, wherein the data stream further comprises a pattern identifying the existence of the reference.

12. A method according to claim 1, wherein a third process is initiated in the second server, the second process communicates the reference to the third process, and the retrieving from the second mapping structure step is accomplished by the third process which returns to the second process the reference which refers to the second server object corresponding to the particular first server object.

13. A method according to claim 1, further comprising initiating a manager process on a computer, the first process transmitting the stream of data over a communications path to the manager process, and the manager process forwarding the stream of data over the communications path to the second process.

14. A method according to claim 1, further comprising the first process transmitting the stream of data over a communications path directly to the second process.

15. A method according to claim 1, wherein the first server comprises a first server coupled to a network, the second server comprises a second server coupled to the network, and the stream of data is transmitted over the network.

16. A system for migrating at least one file and access rights associated with the at least one file from a first network server to a second network server, the first network server having a first memory comprising a first object reference list including a list of first network server objects, the access rights including one or more references associated with the at least one file, each reference referencing a first network server object in the first object reference list, the second network server having a second memory comprising a second object reference list containing a list of second network server objects, a first mapping memory comprising a first mapping structure including an association between a first network server object and a second network server object, the system comprising:

a) a second mapping memory comprising a second mapping structure in one of the first network server and the second network server including mapping information operative to establish which second network server object is associated with which first network server object, each association being retrievable from the second mapping structure as a function of the reference referencing the first network server object;

b) a first process memory including a first process which reads and transmits a stream of data comprising the at least one file and the reference associated with the at least one file;

c) a second process memory including a second process which receives the stream of data, and is operative to recognize in the stream of data the reference associated with the at least one file and store in the second network server the at least one file and a new reference associated with the at least one file which references the second network server object associated with the first network server object; and d) a third process memory including a third process which retrieves from the second mapping structure via the reference the mapping information operative to associate a second network server object with the first network server object associated with the reference.

17. A computer readable medium having encoded thereon a program which provides a method for migrating at least one file and access rights associated with the at least one film from a first server to a second server, the first server having a first object reference list including a list of first server objects, the access rights including one or more references associated with the at least one file, each reference referencing a first server object in the first object reference list, the second server having a second object reference list containing a list of second server objects, a first mapping structure including an association between a first server object and a second server object, the method comprising:

a) for each association in the mapping structure, loading a second mapping structure in one of the first server and the second server with mapping information operative to establish which second server object is associated with which first server object, each association being retrievable as a function of the reference referencing the first server object;

b) initiating a first process which reads and transmits a stream of data comprising the at least one file and the reference associated with the at least one file;

c) initiating a second process which receives the stream of data;

d) recognizing in the stream of data the reference associated with the at least one file;

e) retrieving from second mapping structure via the reference the mapping information operative to associate a second server object with the first server object associated with the reference; and f) storing in the second server the at least one file and a new reference associated with the at least one file which references the second server object associated with the first server object.

* * * * *